(12) United States Patent  (10) Patent No.: US 7,716,610 B2
Challenger et al.  (45) Date of Patent: May 11, 2010

(54) DISTRIBUTABLE AND SERIALIZABLE FINITE STATE MACHINE

(75) Inventors: James R. Challenger, Garrison, NY (US); Louis R. Degenaro, White Plains, NY (US); James R. Giles, Yorktown Heights, NY (US); Paul Reed, Brookline, MA (US); Rohit Wagle, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 11/620,558

(22) Filed: Jan. 5, 2007

(65) Prior Publication Data

US 2008/0168010 A1  Jul. 10, 2008

(51) Int. Cl.
 *G06F 17/50* (2006.01)
(52) U.S. Cl. .............................................. 716/1; 716/4
(58) Field of Classification Search ..................... 716/1, 716/4
See application file for complete search history.

(56) References Cited

U.S. PATENT DOCUMENTS

| | | | |
|---|---|---|---|
| 5,761,484 A | 6/1998 | Agarwal et al. | |
| 5,909,369 A | 6/1999 | Gopinath et al. | |
| 6,212,625 B1* | 4/2001 | Russell | 712/217 |
| 6,978,457 B1* | 12/2005 | Johl et al. | 718/100 |
| 7,039,893 B2 | 5/2006 | DenBraber et al. | |
| 2005/0169286 A1 | 8/2005 | Monette et al. | |
| 2008/0164908 A1* | 7/2008 | Challenger et al. | 326/46 |

OTHER PUBLICATIONS

Godefroid, P., et al., "Using partial-order methods in the formal validation of industrial concurrent programs", 1996, ACM, International Symposium on Software Testing and Analysis, Proceedings of the 1996 ACM SIGSOFT international symposium on Software testing and analysis. pp. 261-269.*
Holzman, Gerald, "Algorithms for automated protocol validation", Sep. 21, 1988, AT&T Technical Journal, vol. 69, No. 2, pp. 1-17.*
http://www.igda.org/ai/report-2004/fsm.html,Working Group on Finite State Machines,International Game Developers Association, 2004.
http://www.codeproject.com/csharp/xmlfsm.asp,XML Finite State Machine in C#,Apr. 1, 2002,Kevin Stewart.
Flora-Holmquist,Morton,O'Grady,Staskauskas,The Virtual Finite-State Machine Design and Implementation Paradigm,Winter1997,Bell Labs Technical Journal.
Diane Jordan,John Evdemon,wsbpel-specification-public_review_draft_2,available at http://oasis-open.org/committees/tc_home.php?wg_abbrev=wsbpel#overview,Jan. 2007.
U.S. Appl. No. 11/619,691, filled Jan. 4, 2007,and titled "Data-Driven Finite State Machine Engine for Flow Control".

* cited by examiner

*Primary Examiner*—Stacy A Whitmore
(74) *Attorney, Agent, or Firm*—George Willinghan; August Law, LLC

(57) ABSTRACT

A distributable and serializable finite state machine and methods for using the distributable and serializable finite state machine are provided wherein finite state machine instance can be location-shifted, time-shifted or location-shift and time-shifted, for example by serializing and deserializing each instance. Each instance can be located-shifted between agents, and a persistent memory storage location is provided to facilitate both location-shifting and time-shifting. Finite state machine instances and the actions that make up each instance can be run in a distributed fashion among a plurality of agents.

23 Claims, 7 Drawing Sheets

DISTRIBUTABLE AND SERIALIZABLE FINITE STATE MACHINE

STATEMENT REGARDING FEDERALLY SPONSORED RESEARCH

The invention disclosed herein was made with U.S. Government support under Contract No. H98230-05-3-0001 awarded by the U.S. Department of Defense. The Government has certain rights in this invention.

FIELD OF THE INVENTION

The present invention relates to information processing systems. More particularly, the present invention relates to methods and apparatus for data driven finite state machine engine for flow control in a distributed computing environment.

BACKGROUND OF THE INVENTION

Finite State Machines (FSMs), also known as finite automata, depict behavioral models composed of inputs, states, transitions, and outputs (or actions). Two well known finite state machine types are Moore and Mealy FSMs. In Moore machines, the output depends on state, whereas in Mealy machines the output depends on transition. These FSM abstractions were described by their namesakes in the late 1950's and have been widely utilized in a variety of fields including mathematics, logic, linguistics and computer science, for the past half century. In practice, many FSMs employ both types of machines in combination. Other FSMs have also been described, as have methods to transform one type into another.

Specified FSMs can be classified into two groups: recognizers and transducers. Recognizers produce binary output: yes/true (recognized) or no/false (not recognized). Transducers generate output based on input and/or current state and are often used to control applications. Transducers transform (or map) ordered sets of input events into corresponding ordered sets of output events.

FSMs are used with some regularity to control computer systems and applications, both in hardware and software. In many applications, the specified FSMs are hard-wired or hard-coded, as the case may be, into the system or application. In general, the FSM is developed based upon a specific application, and methods or systems are required to provide for the creation or development of the FSM in accordance with the application requirements. Some customizable general purpose FSMs have been devised to aide in the development of control mechanisms for computer systems and applications.

An example of a system and method for implementing a FSM based upon configuration data is disclosed in U.S. Pat. No. 7,039,893. A FSM Engine is used to generate specific configurations for different state machines based on configuration data using a common method. This common configuration structure is used for all state machine implementations, and changes in the state machine design drive changes in the configuration data instead of in executable software. Multiple software state machines are thus implemented using a configurable approach. In addition, state machine processing is performed periodically and state transition events are handled without the need for an event driven operating system. The disclosed approach, however, has several deficiencies. For example, a new FSM is needed for each instance, and customized executable code, e.g., as described in the preferred embodiment the "configuration data" are C language code and header files, is produced from the FSM model. In addition, a new production-compilation-deployment cycle is needed to incorporate FSM model changes into running systems.

An alternative approach utilized web services-business process execution language (WS-BPEL) that provides both externalization and an execution engine. However, WS-BPEL does not enforce FSM control flows. Therefore, WS-BPEL flows can be written that do not conform to any FSM Specification. Another disadvantage of WS-BPEL is that there are no guarantees to model the entire flow, e.g. all states and state transitions, thus failing to provide any level of assurance or provability.

Expressing an FSM externally as Extensible Markup Language (XML) is also well known in the Artificial Intelligence (AI) and computer gaming literature (see for example http://www.igda.org/ai/report-2004/fsm.html or http://www-.codeproject.com/csharp/xmlfsm.asp). These externally specified FSMs have not separated execution from state maintenance.

More generally, FSMs have been defined using state tables as in "The Virtual Finite State Machine Implementation Paradigm" (see http://www.lucent.com/minds/techjournal/pdf/winter_97/paper08.pdf). Again, these techniques have been used to generate customized code.

Finite State Machines (FSMs) have been employed to solve a wide variety of problems since their conception in the 1950's. They've often been embedded within applications. Some embedded FSMs have a distributed aspect. For example, in published U.S. Patent Application no. 2005/0169286 titled "Distributed finite state machine", an embedded FSM is used to provide "a rate limiting mechanism in the router". Although a particular distributed FSM is described, no instruction is directed toward a general system for defining and employing arbitrary, distributed FSMs. In U.S. Pat. No. 5,761,484 titled "Virtual interconnections for reconfigurable logic systems" another embedded distributed finite state machine is described, but no teaching on how to describe and implement arbitrary, distributed FSMs in a structured and systematic way is presented. In U.S. Pat. No. 5,909,369 titled "Coordinating the states of a distributed finite state machine" a method for coordinating the states of a distributed finite state machine is given. However, the previous methods fail to disclose a method and system to specify and manage user defined FSMs, including the behavior of FSMs, i.e., states, transitions and actions, and the distribution of FSM components in time and space.

SUMMARY OF THE INVENTION

The present invention is directed to a method for utilizing finite state machines in a computing system. In one embodiment, at least one instance of a finite state machine specification containing a plurality of states and a plurality of transitions between the states is initiated on a first agent. This finite state machine instance is then shifted from the first agent to a second agent. In one embodiment, initiation of the instance includes initiating a plurality of concurrent finite state machine instances for at least one finite state machine. These plurality of finite state machine instances are initiated on two or more first agents. Having initiated a plurality of instance, shifting of these instances involves shifting the finite state machine instances among a plurality of different agents.

In one embodiment, shifting of each finite state machine instance includes removing the finite state machine instance from the first agent, saving the removed finite state machine instance in persistent storage, removing the finite state machine instance from persistent storage and resuming the finite state machine instance on the second agent. In addition, any given finite state machine instance can be removed from the first agent, saved in persistent storage and held in persistent storage for a period of time. After the expiration of this period of time, the finite state machine instance is removed from persistent storage and returned to the first agent, i.e. it is time shifted. In one embodiment, shifting finite state machine instances includes serializing the finite state machine instance, deserializing the finite state machine instance, serializing context data associated with the finite state machine instance, and deserializing the context data. Serializing the finite state machine instance further includes serializing the finite state machine instance at the first agent, and deserializing the finite state machine instance further includes deserializing the finite state machine instance at the second agent. In one embodiment, serializing the context data further includes serializing the context data at the first agent, and deserializing the context data further includes deserializing the context data at the second agent.

The transitions associated with the finite state machine instance are executed to move the finite state machine instance between at least one of the states and agents. Execution of the transitions includes executing one or more distributed actions associated with each transition. These action associated with each transition can be executed on two or more agents. In one embodiment, the finite state machine instance is shifted in response to the execution of one of the transitions. In one embodiment, at least one externalized queue is created, and the current state of the initiate finite state machine instance is recorded in the externalized queue. This externalized queue is utilized between an application requesting the finite state machine instance and the finite state machine instance. In one embodiment, creation of the externalized queue includes creating a finite state machine proxy. In one embodiment, the externalized queue is disposed on a third agent different from the first and second agents.

Methods for utilizing finite state machines in a computing system in accordance with the present invention also include initiating on a first agent at least one instance of a finite state machine specification containing a plurality of states and a plurality of transitions between the states, removing the finite state machine instance from the first agent, saving the removed finite state machine instance in persistent storage and holding the finite state machine instance in persistent storage for a period of time. In one embodiment, the finite state machine instance is serialized. In one embodiment, the finite state machine instance is removed from persistent store following expiration of the period of time and returned to the first agent. In another embodiment, the finite state machine instance is removed from persistent storage and returned to a second agent. In one embodiment, shifting the finite state machine instances includes at least one of serializing the finite state machine instance, deserializing the finite state machine instance, serializing context data associated with the finite state machine instance and deserializing the context data.

Embodiments of the present invention are also directed to methods for utilizing finite state machines in a computing system that include initiating on a first agent at least one instance of a finite state machine specification containing a plurality of states and a plurality of transitions between the states, serializing the finite state machine instance in progress and deserializing the finite state machine instance. In one embodiment, serializing includes serializing the finite state machine instance on a first agent, and deserializing includes deserializing the finite state machine on a second agent. In one embodiment, the first agent is disposed on a different physical node than the second agent. In one embodiment in order to advance the finite state machine instance through the states, a plurality of transitions is executed. The plurality of transitions can be executed in series. In one embodiment, one or more actions associated with each transition are executed on two or more agents. The present invention is also directed to computer-readable mediums containing a computer-readable code that when read by a computer causes the computer to perform method for utilizing finite state machines in a computing system in accordance with the present invention.

The present invention is also directed to a method for managing finite state machines in a computing system using an application program interface. In accordance with this method, a distributed finite state machine control application program interface is used to perform at least one of determining a set of finite state machine instances, selecting a target instance, forwarding a transition to a target instance, forwarding an event to a target instance, registering an instance, unregistering an instance, registering a transition event and unregistering a transition event.

DETAILED DESCRIPTION

Figure 1:
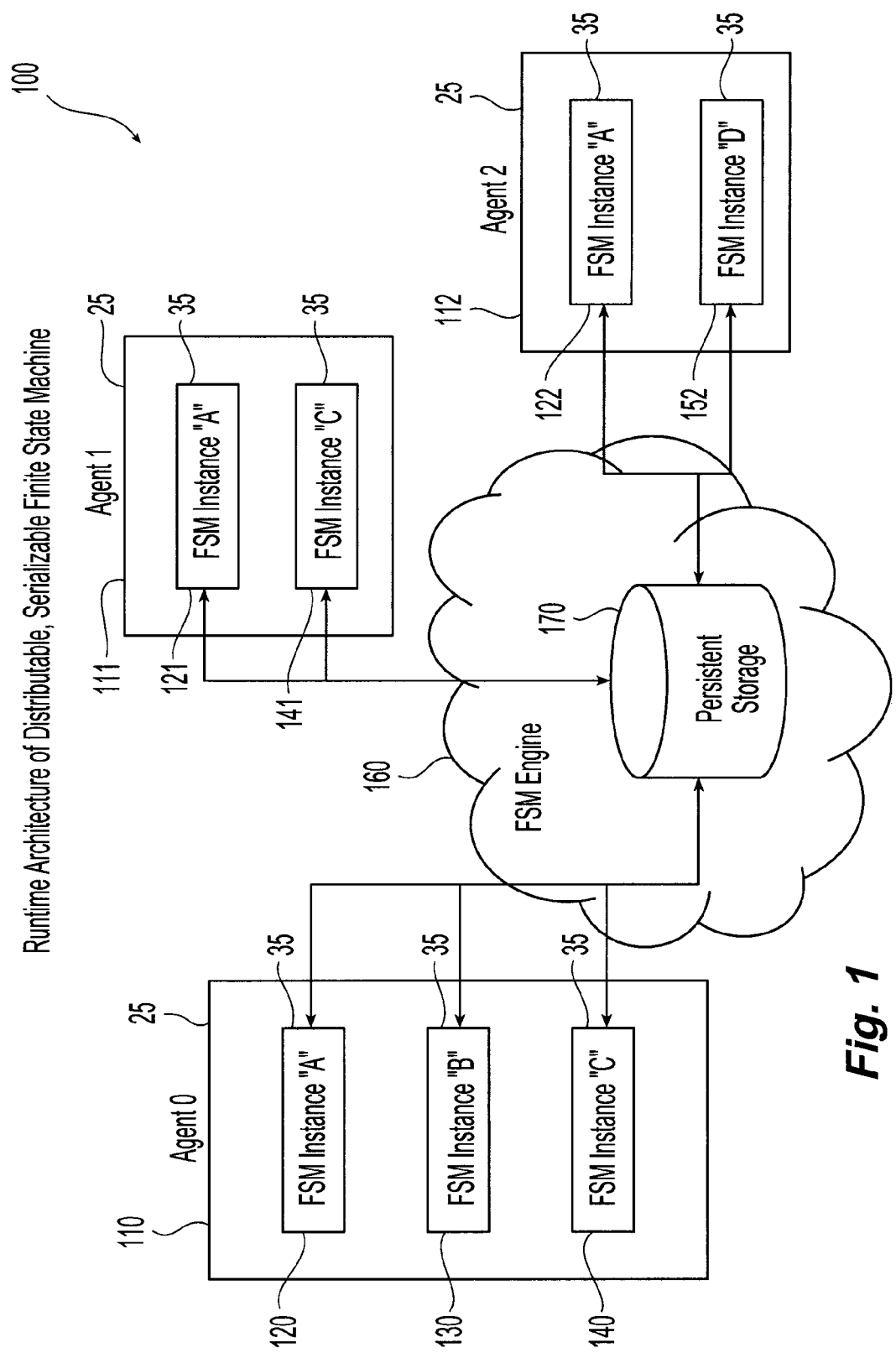
FIG. 1 is a schematic representation of an embodiment of a runtime architecture of a distributable, serializable finite state machine in accordance with the present invention.

A finite state machine (FSM), including either a Mealy or a Moore FSM, facilitates behavior modeling. FSMs are generally well known to those of skill in the art and typically contain states, transitions between the states and actions contained in each transition. Included within a given FSM are instructions regarding how to begin a process, how to move between states within a process via transitions, what actions to take when entering a state, leaving a state, or performing a transition and how to end a process.

Object technology in general, for example classes in the Java language, is widely used. Objects allow for defining entity types and for creating object instances, which are realizations of particular occurrences of such typed entities.

A finite state machine instance ("FSM Instance") is an object instance representation of an FSM, as described, for example, in U.S. patent application Ser. No. 11/444,129 filed May 31, 2006 and titled "Unified Job Processing Of Interdependent Heterogeneous Tasks and U.S. patent application Ser. No. 11/619,691 filed Jan. 4, 2007 and titled "Data-Driven Finite State Machine for Flow Control". In general, finite state machines are utilized in a computing system to run instances of user-defined routines. Initially, one or more schemas are defined that contain the validity parameters for any finite state machine. User-generated finite state machine specifications, which contain a plurality of states and a plurality of transitions between the states, are evaluated for compliance with the schemas. In one embodiment, each one of the plurality of transitions includes at least one method invocation on at least one object instance. In one embodiment, at least one transition in the plurality of transitions is a time-based transition. The object instances can be determined at runtime. In one embodiment, the plurality of transitions is used to process event objects that contain computing system context additional to proxy state.

Compliant user-generated finite state machine specifications are interpreted. When a request is received from a computing system for an instance of the user-generated finite state machine specification, the requested instance of the user-generated finite state machine specification is initiated. One or more of the plurality of transitions and the actions that constitute each transition in the finite state machine specification are used to advance the instance of the user-generated finite state machine specification through the plurality of states. In one embodiment, a notification mechanism to be invoked when processing at least one of the plurality of transitions in the requested instance of the finite state machine specification is specified. In addition, externally defined states and transitions can be annotated with descriptive information, for example in the form of name-value pairs. In one embodiment, a user-generated finite state machine specification containing properties associated with a state, a transition or combinations thereof is interpreted, for example by the interpretive FSM Engine. The FSM then makes this information available to one or more computing systems on demand, i.e. the defined properties are communicated to the computing systems.

In order to facilitate compliance with the prescribed schema, the defined schema is communicated to one or more users and the finite state machine engine that receives the user-generated finite state machine specifications and evaluates these specifications for compliance with the schema. These user-generated finite state machine specifications can be expressed as an extensible mark-up language document or as a diagram in a unified modeling language editing tool.

In one embodiment in order to execute the requested instance of the finite state machine, the current state of the initiated requested instance of the user-generated finite state machine is recorded in an externalized queue. Preferably, the externalized queue is a proxy that represents the current state of the initiated requested instance of the user-generated finite state machine specification.

In addition to receiving and initiating instances of new finite state machine specifications, updates to existing specifications can also be handled. In one embodiment, a user-generated finite state machine specification update is received from a user at the finite state machine engine and is evaluated for compliance with the schemas. These user-generated finite state machine specification updates include updates to at least one previously interpreted user-generated finite state machine specification. As with the original finite state machine specifications, the user-generated finite state machine specification update is interpreted, and the previously interpreted user-generated finite state machine specification is updated in accordance with the user-generated finite state machine specification update. These updates include, but are not limited to, adding one or more transitions, deleting one or more transitions, changing an existing transition, adding method calls that perform an existing transition, removing method calls that perform an existing transition, adding an object map, deleting an object map, changing an object map, adding a state, removing a state, changing a state, adding a state entry method call, deleting a state entry method call, adding a state exit method call, deleting a state exit method call and combinations thereof.

A given FSM can have multiple instances, and each FSM Instance of that given FSM represents a separately executing process represented by that FSM. Each FSM Instance operates with its own private contextual information. FSM Instances may or may not share the same executable code. An FSM Instance is considered to be an atomic unit, not in-and-of itself separable into smaller parallizable pieces for distribution among a collection of processing agents. An FSM Instance may be represented by an FSM Externalized Queue or FSM Proxy to an FSM Engine that processes transitions specified by the FSM to advance FSM Instances between states. As with the FSM Instance, the FSM Proxy and the FSM Engine follow the object technology model. Although the terms FSM Proxy and FSM Instance are sometimes used interchangeably, and at an abstract level this is correct, in practice the FSM Proxy is distinguishable from the FSM Instance and provides an interface between the application utilizing the FSM Instance and the FSM Instance. In one embodiment, the FSM Proxy offers a level of indirection such that, for example, the instance may be local to one platform or host, and the proxy may be remotely located within a distributed application.

As an example of FSM Instances, a financial institution may define an FSM enabling customers to acquire a home mortgage. Other FSMs representing a variety of control flows may also be defined for tasks such as obtaining a car loan, opening a new customer checking account and transferring funds from another financial institution.

For each customer application for a home mortgage, a new FSM Instance of the home mortgage FSM is created. Each FSM Instance represents one home mortgage application control flow context and includes a current state and valid transitions to next states. FSM Instances may share the same control flow, e.g., shared executable code, but each FSM Instance has its own private context, e.g., current state. At any instant in time, multiple FSM Instances of the mortgage application FSM may be running, for example one FSM Instance in an application received state, another in a waiting for property appraisal state and yet another in an approved state.

Operations, e.g., FSM Transitions, on FSM Instances are transactional and follow the well known atomicity, consistency, isolation, and durability (ACID) properties associated with database management. For example, two separate updates occurring to one mortgage application in close time proximity will produce the desired and correct result in the application. A transition to add property appraisal information does not unintentionally wipe out some previous transition that saved customer credit check information.

An "agent" is any FSM Instance host, which could be, for example, a separate hardware computing platform or a virtual machine. Continuing the mortgage application analogy, each bank branch may be an "agent" where a customer's mortgage application is processed in part. The local branch (e.g., agent) may accept the mortgage application. A central branch (e.g., another agent) may process a certain aspect of the mortgage application, such as performing a credit check. A hired outside authority (e.g., yet another agent) may process another aspect such as an appraisal of the associated property. And so forth.

Figure 2:
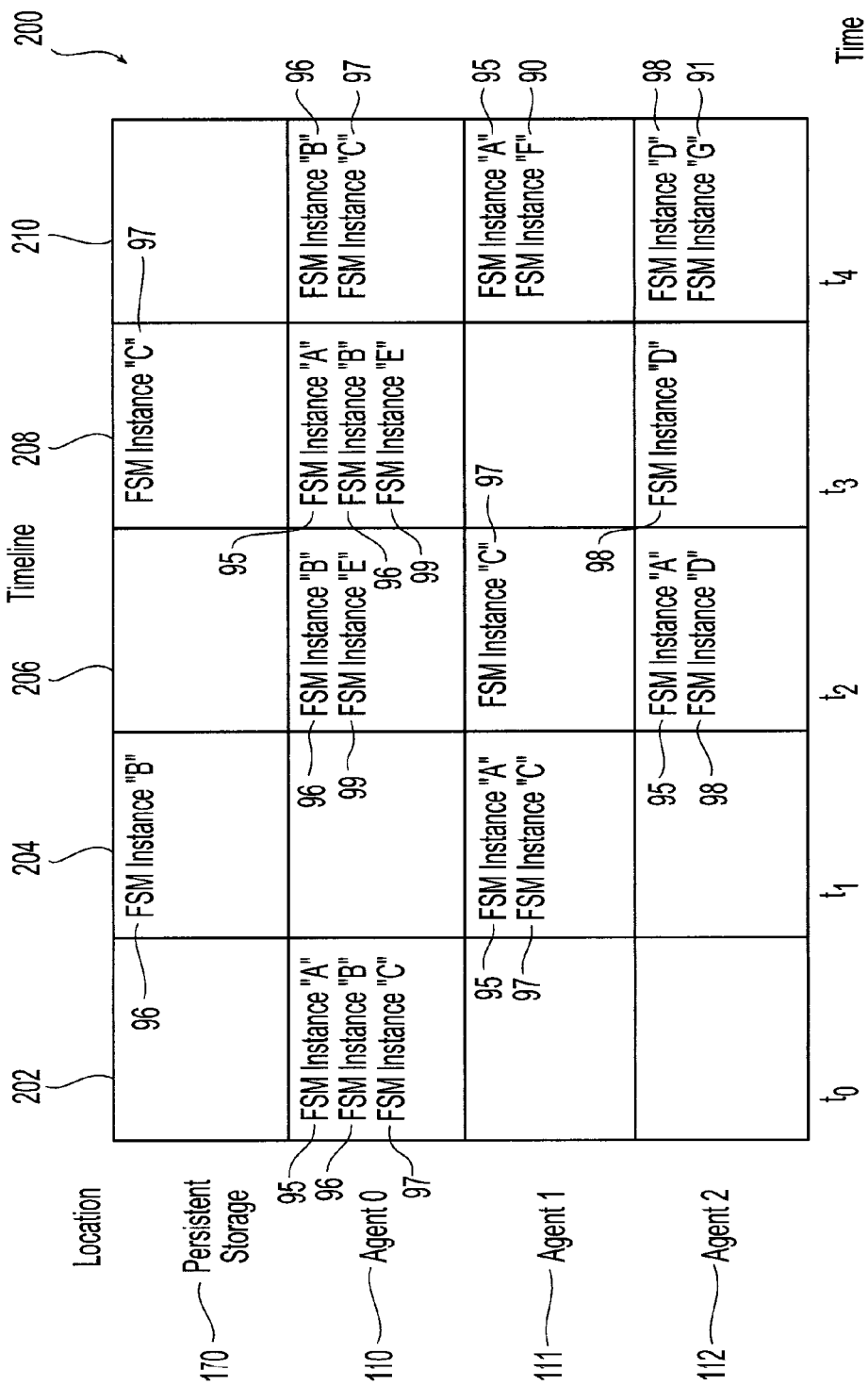
FIG. 2 is an illustration of an embodiment of a timeline depicting distribution of finite state machine instances across time periods and locations.

Referring to FIG. 1, an exemplary embodiment of a runtime architecture 100 for handling instances of a distributable, serializable finite state machine in accordance with the present invention is illustrated. The architecture contains three agents 25, "Agent 0" 110, "Agent 1" 111, and "Agent 2" 112, although suitable architectures are not limited to any number of agents. A plurality of FSM Instances 35 of a given FSM can be deployed on these agents. Hosted on "Agent 0" are FSM Instances "A" 120, "B" 130 and "C" 140. On "Agent 1" are shown FSM Instances "A" 121 and "C" 141. On "Agent 2" are shown FSM Instances "A" 122 and "D" 152. The architecture illustrates how the FSM Instances can be located on various agents; however, the architecture does not illustrate any given time period. Therefore, for example, FSM Instance "A" can be located on all three agents at three different times, not all at the same time. The location of the various FSM Instances over time is illustrated in FIG. 2.

As is illustrated in FIG. 1, suitable agents 25 include, but are not limited to, computer hardware platforms and virtual machines capable of hosting applications that employ distributable finite state machine technology as described herein. Therefore, the architecture further includes at least one FSM Engine 160. The FSM Engine processes the transitions associated with each FSM Instance. Transitions move the finite state machine of an FSM Instance from state to state, beginning at its start state and terminating at its end state. In one embodiment, a single FSM Engine is shared by a plurality of agents. Alternatively, the architecture includes a plurality of FSM Engines, and each engine is associated with one or more agents. In one embodiment, FSM Instances are represented to the FSM Engine by an FSM Proxy as described in, for example, U.S. patent application Ser. No. 11/619,691 filed Jan. 4, 2007 and titled "Data-Driven Finite State Machine for Flow Control".

In one embodiment, the architecture includes at least one persistent storage 170 system. The persistent storage systems are in communication with the agents and the FSM Engines. Suitable persistent storage systems include, but are not limited to, databases, computer file systems, hard drives, messages to another host and combinations thereof. FSM Instances at a given current state are saved to the persistent storage. FSM Engines, which are in communication with the agents, evict or remove a persisted FSM Instance from a first agent and transfer or resume the same FSM Instance on a second agent. In addition, FSM Engines evict a persisted FSM Instance from a first agent, place that FSM Instance in persistent storage, remove that instance from persistent storage at some later time and resume the same FSM Instance on the second agent or the first agent. Therefore, the FSM Engines working in conjunction with the agents and persistent storage shift FSM Instances in either time or location or both time and location. Therefore, FSM Instances are time-shifted, location-shifted, or both.

Mapping the home mortgage application example to FIG. 1, "Agent 0" 110 is a computing platform located at a local branch. "Agent 1" 111 is a computing platform at a central branch, and "Agent 2" 112 is a computing service provided by a third party. FSM Instance "A" is a mortgage application for George and Martha Washington. FSM Instance "B" is a mortgage application for Thomas Jefferson, and FSM Instance "C" is a mortgage application for John and Abigail Adams. FSM Instance "D" is a car loan application for Alexander Hamilton that is in need of a used car appraisal.

At a first point in time, the Washington's mortgage application, FSM Instance "A" 120, is accepted at the local bank branch "Agent 0" 110. At a second point in time the mortgage application, FSM Instance "A" 121 has been transferred to the central bank branch "Agent 1" 111 for processing a customer credit check. At a subsequent third period of time, the mortgage application, FSM Instance "A" 122, has been transferred to another service provider "Agent 2" 112 for a property appraisal. At a given point in time, Jefferson's mortgage application, FSM Instance "B" 130 has arrived at the local bank branch "Agent 0" 110, for example to start a credit check.

Referring to FIG. 2, an exemplary embodiment of a timeline 200 of FSM Instances deployed to various agents from time period to through time period $t_4$ is illustrated. The timeline illustrates time-shifted and location-shifted. FSM Instances. During time $t_0$ 202, FSM Instances "A" 95, "B" 96 and "C" 97 are deployed to "Agent 0" 110. There are no FSM Instances currently running on "Agent 1" 111 or "Agent 2" 112. In addition, there are no FSM Instances in persistent storage 170.

During time period $t_1$ 204, FSM Instances "A" and "C" have been deployed to "Agent 1" 111, and "Agent 0" and "Agent 2" have no running FSM Instances. FSM Instance "B" has been placed into persistent storage 170 during this time period. Thus, FSM Instances "A" and "C" have been location-shifted from the previous time period to the present time period. That is, between time periods $t_0$ and $t_1$, FSM Instances "A" and "C" moved from "Agent 0" to "Agent 1". Moving involves evicting the instance from the agent where it was installed, then deploying and resuming the instance at the new agent. FSM Instance "B" is in the process of being time-shifted, having been delegated to persistent storage 170 and evicted from "Agent 0".

During time period $t_2$ 206, FSM Instance "C" remains on "Agent 1". Thus, during time period $t_2$ FSM Instance "C" has been neither time-shifted nor location-shifted. FSM Instance "A" has been moved again, this time from "Agent 1" 111 to "Agent 2" 112. Therefore, during time period $t_2$ FSM Instance "A" has once again been location-shifted. FSM Instance "B" has been removed from persistent storage and redeployed and resumed on "Agent 0". The time-shifting of FSM Instance "B" has been completed. New FSM Instances "D" and "E" 98, 99 have been deployed to "Agent 2" and "Agent 0" respectively.

During time period $t_3$ 208, FSM Instances "B", "D", and "E" continue on the same agents from the previous period respectively, no time- or location-shifting. FSM Instance "A" has once again been location-shifted, this time from "Agent 2" to "Agent 0". FSM Instance "C" is now in the process of being time-shifted, having been evicted from "Agent 1" and saved to persistent storage.

During time period $t_4$ 210, FSM Instances "B" and "D" continue on the same agents from the previous period respectively, no time- or location-shifting. FSM Instance "A" has once again been location-shifted, this time from "Agent 0" to "Agent 1". FSM Instance "C" has been removed from persistent storage and redeployed and resumed on "Agent 0", completing the time-shifting of FSM Instance "C". FSM Instance "E" has completed processing and does not appear in either an agent or in persistent storage. New FSM Instances "F" 90 and "G" 91 have been deployed to "Agent 1" and "Agent 2" respectively.

Figure 3:
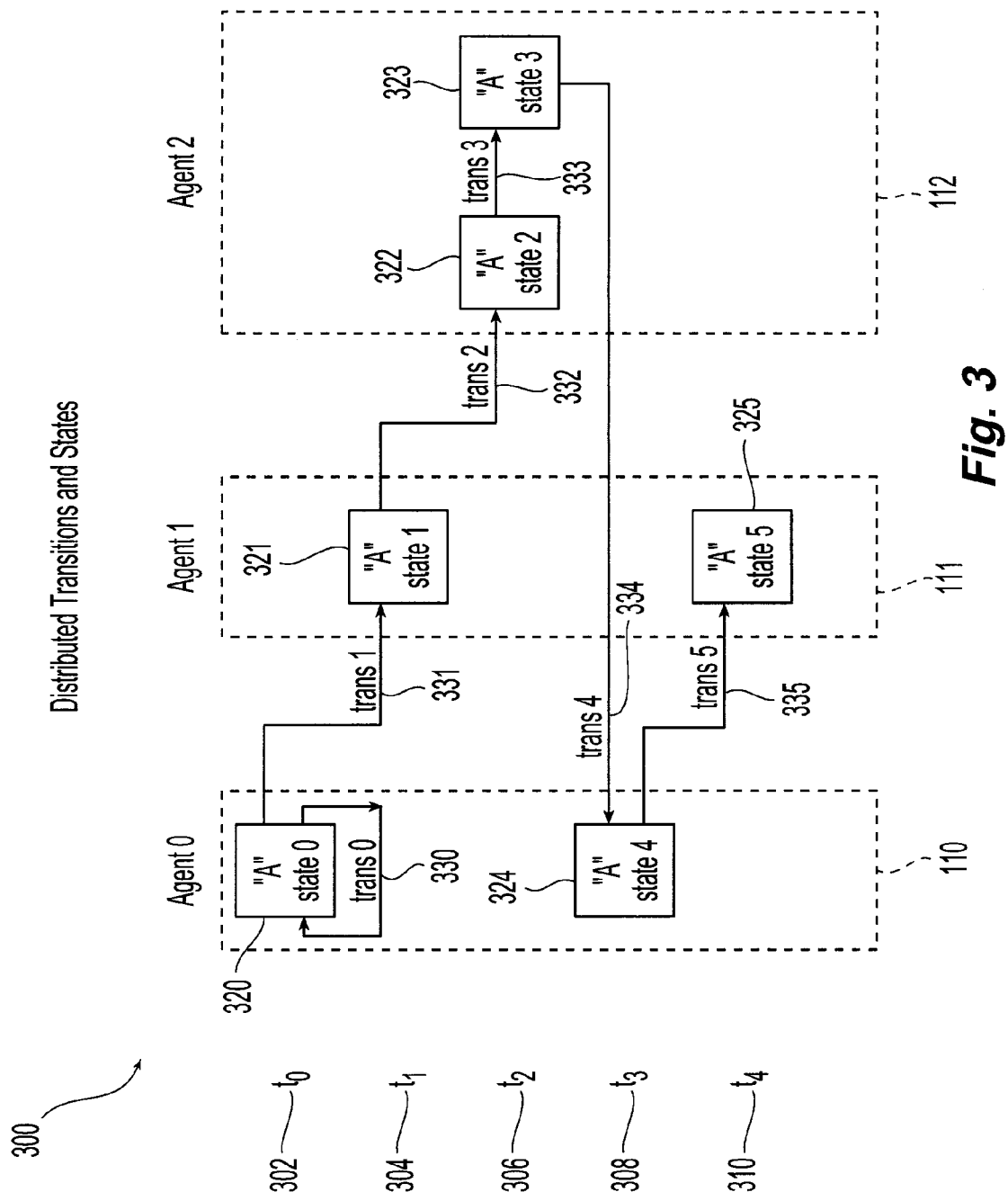
FIG. 3 is a schematic representation of an embodiment of the distribution of finite state machine transitions and states.

Referring to FIG. 3, an exemplary embodiment of the distribution of a single FSM Instance over time 300 among a plurality of agents in accordance with the present invention is illustrated. During time period $t_0$ 302, FSM Instance "A" is deployed to "Agent 0" 110 and is in "State 0" 320. "Transition 0" 330 occurs, causing the state of FSM Instance "A" to advance to "State 0", with no effect on its location. Although the transition did not cause the FSM Instance to change state or location, transitions that advance a given instance to the same state may cause state exit, transition and re-entry actions to occur. "Transition 1" 331 occurs, advancing the state of FSM Instance "A" from "State 0" to "State 1" 321 and causing FSM Instance "A" to be location-shifted from "Agent 0" to "Agent 1" 111.

During time period $t_1$ 304, FSM Instance "A" is deployed to "Agent 1" and is in "State 1" 321. "Transition 2" 332 occurs, advancing the state of FSM Instance "A" to "State 2" 322 and shifting FSM Instance "A" to "Agent 2" 112.

During time period $t_2$ 306, FSM Instance "A" is deployed to "Agent 2" 112 and is initially in "State 2" 322. "Transition 3" 333 occurs, advancing FSM Instance "A" from "State 2" to "State 3" 323. However, no location-shift occurs in this case. Later, "Transition 4" 334 occurs, causing the state of FSM Instance "A" to advance from "State 3" to "State 4" 324 and shifting FSM Instance "A" from "Agent 2" to "Agent 0" 110.

During time period $t_3$ 308, FSM Instance "A" is deployed to "Agent 0" and is in "State 4" 324. Next, "Transition 5" 335 occurs, advancing FSM Instance "A" from "State 4" to "State 5" 325. "Transition 5" causes FSM Instance "A" to be once again location-shifted, this time from "Agent 0" to "Agent 1" 111. During time period $t_4$ 310, FSM Instance "A" is deployed to "Agent 1" 111 and is in "State 5" 325. A transition, a state entry or a state exit may trigger location-shifting, time-shifting or both location-shifting and time-shifting.

Figure 4:
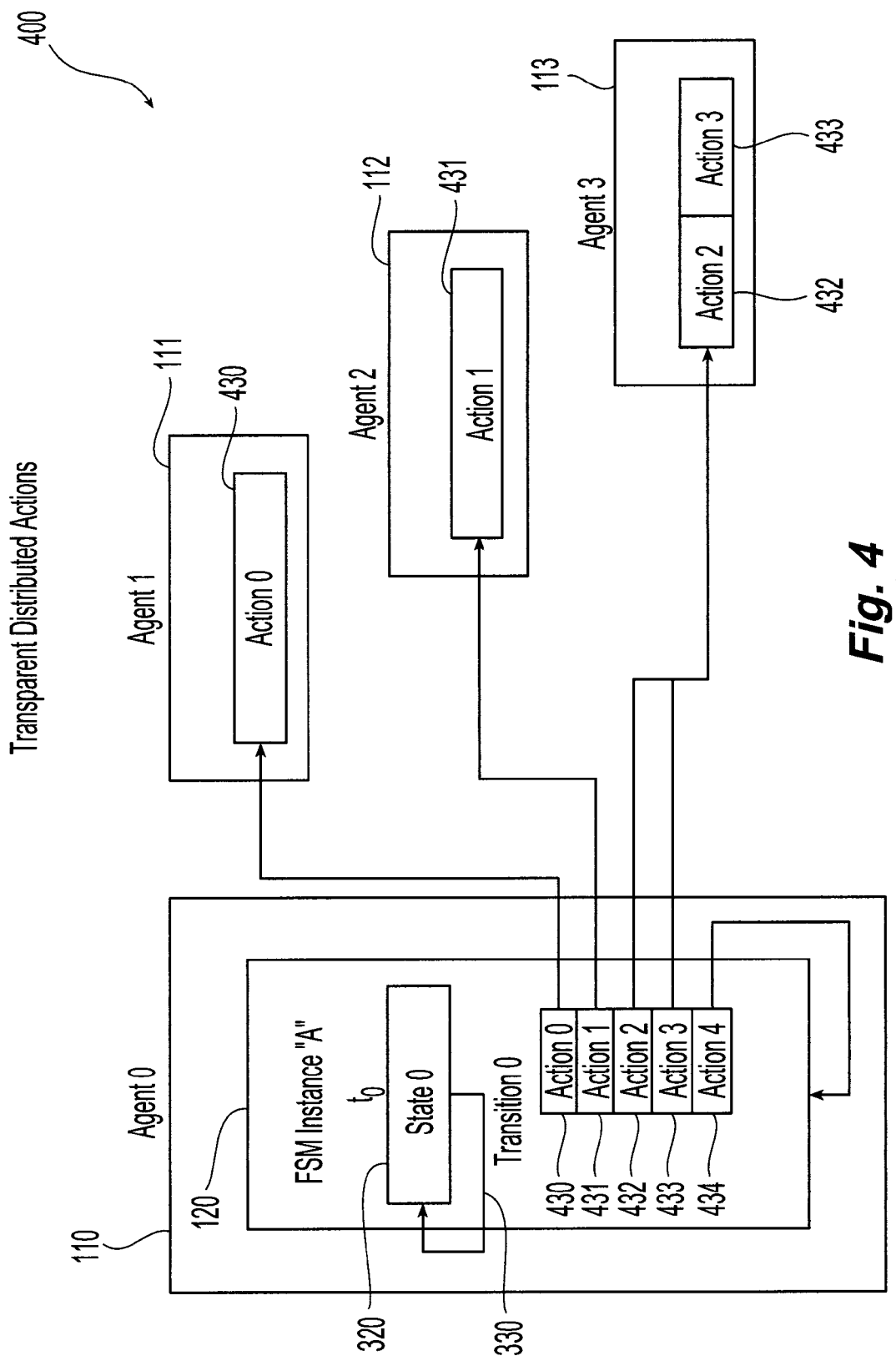
FIG. 4 is a schematic representation of an embodiment of the distribution of finite state machine actions among agents.

Referring to FIG. 4, an exemplary embodiment an FSM Instance having its actions transparently distributed 400 among a collection of agents in accordance with the present invention is illustrated. During time period $t_0$, FSM Instance "A" 120 is deployed to "Agent 0" 110 and is in "State 0" 320. "Transition 0" 330 occurs, the effect of which is to cause a sequence of actions 430, 431, 432, 433, and 434 to be carried out as the transition implementation before landing back in "State 0" again. The sequence of actions is executed sequentially in a distributed fashion from the first action, "Action 0" 430, through the last action, "Action 4" 434. "Action 0" is executed on "Agent 1" 111, "Action 1" is executed on "Agent 2" 112, "Action 3" and "Action 4" are executed on "Agent 3" 113, and "Action 4" is executed on "Agent 0" 110. In another embodiment, these actions are executed in parallel (not shown). Although not shown, state entry and exit actions, if any, are similarly distributable.

Figure 5:
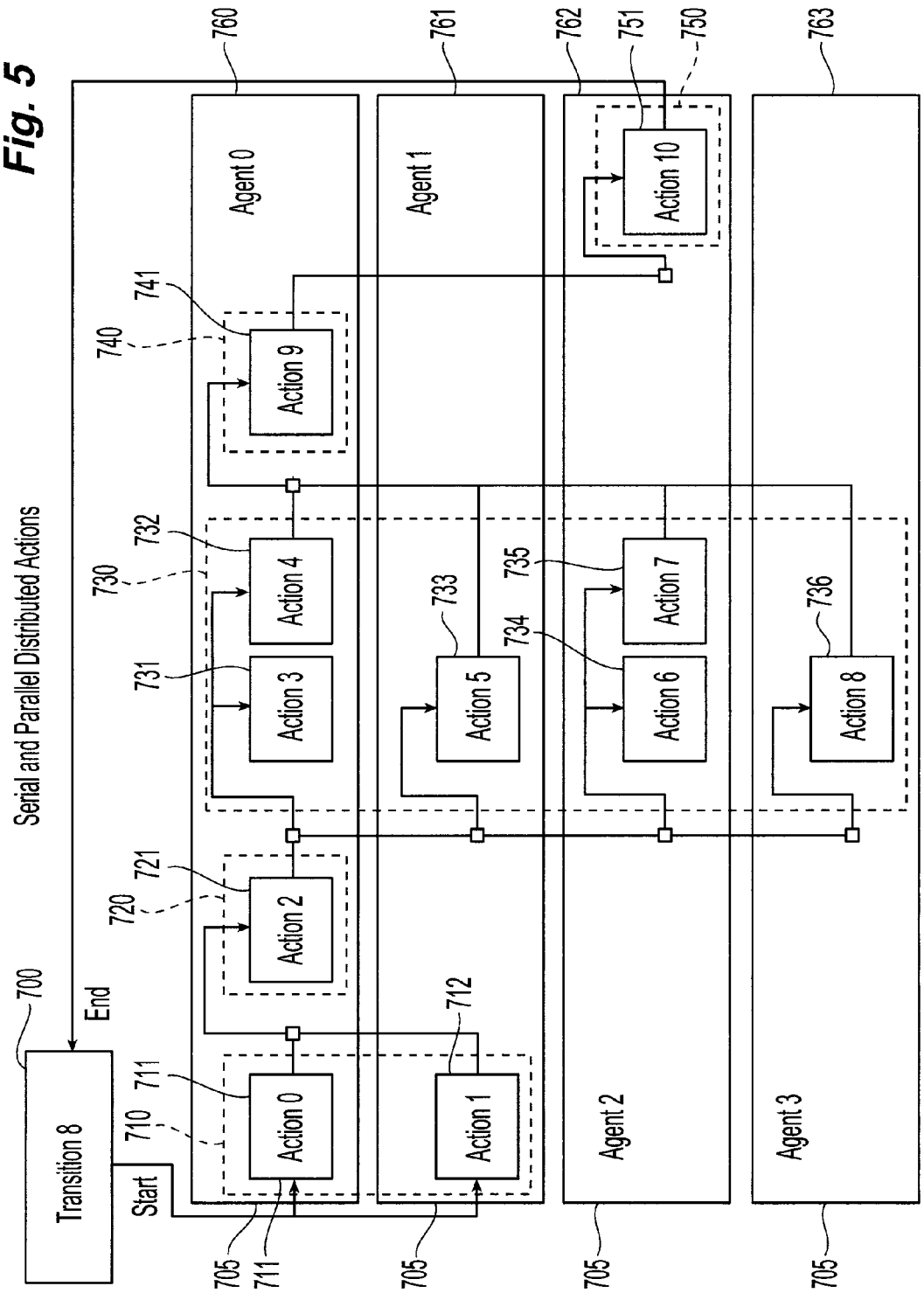
FIG. 5 is a schematic representation of an embodiment of serial and parallel distribution actions of a transition in accordance with the present invention.

Referring to FIG. 5, an exemplary embodiment of a single FSM Transition 700 containing a plurality of actions that are executed both in series and in parallel on a plurality of agents in accordance with the present invention is illustrated. This transition 700, referred to as "Transition 8", contains action 0 through action 10 for a total of eleven actions. These eleven actions are arranged in a plurality of groups. As illustrated, the actions are arranged in five groups 710, 720, 730, 740, 750. Each group contains at least one action. The action groups are executed in serialized fashion in that all of the actions contained in a first group are executed before any of the actions in a second group. For example, the two actions contained in the first group 710 are completed before the single action in the second group 720 is triggered. Thus, the second action group 720 cannot start until the first action group 710 is completed. Likewise, the third action group 730 cannot start until the second action group 720 completes and so forth until the fifth action group 750. Since the transition 700 is not complete until all of the actions in the transition are complete, transition 700 is not finished until the fifth action group 750 is completed. The transition 700 was initiated by executing the first action group 710.

Although the action groups are executed in series, actions within a given action group can be executed either in series or in parallel. For example, in the first action group 710, "Action 0" 711 and "Action 1" 712 are executed in parallel. In the second action group 720 there is only a single action, "Action 2" 721. In the third action group 730, "Action 3" 731, "Action 4" 732, "Action 5" 733, "Action 6" 734, "Action 7" 735 and "Action 8" 736 are initiated or executed in parallel. Following the execution of all the actions in the third action group 730, the single action, "Action 9" 741, in the fourth action group 740 is executed followed by the execution of the single action "Action 10" 751 in the fifth action group 750.

As was discussed and illustrated in FIG. 4, the actions in the action groups of FIG. 5 are executed on a plurality of agents 705. Any number and arrangement of agents can be used, and each action can be executed on a distinct agent. As illustrated, the plurality of agents includes "Agent 0" 760, "Agent 1" 761, "Agent 2" 762 and "Agent 3" 763. Action 0, Action 2, Action 3, Action 4 and Action 9 are executed on or performed by "Agent 0" 760. Action 1 and Action 5 are performed by "Agent 1" 761, and Action 6, Action 7 and Action 10 are performed by "Agent 2" 762. Action 8 is performed by "Agent 3" 763. Distribution of actions among the plurality of agents is governed through a Distributed FSM Control API discussed below with respect to FIG. 6. Whether containing actions are executed in series, in parallel or both, a transition, state entry or state exit containing these actions must have all these actions completed before the corresponding operation or transition is completed, e.g., new state realized upon transition completion.

Each agent, in order to execute the given action, may need FSM or application specific context information. In addition, each action may independently send events that may trigger another transition from the present state of the FSM Instance. During the current transition, state entry or state exit, the distributed group of actions, regardless of whether the actions occur in series or in parallel, that constitute the transition operate under the same unchanging FSM Instance state. An FSM Instance state change does not occur until all actions of the current transition are completed.

Figure 6:
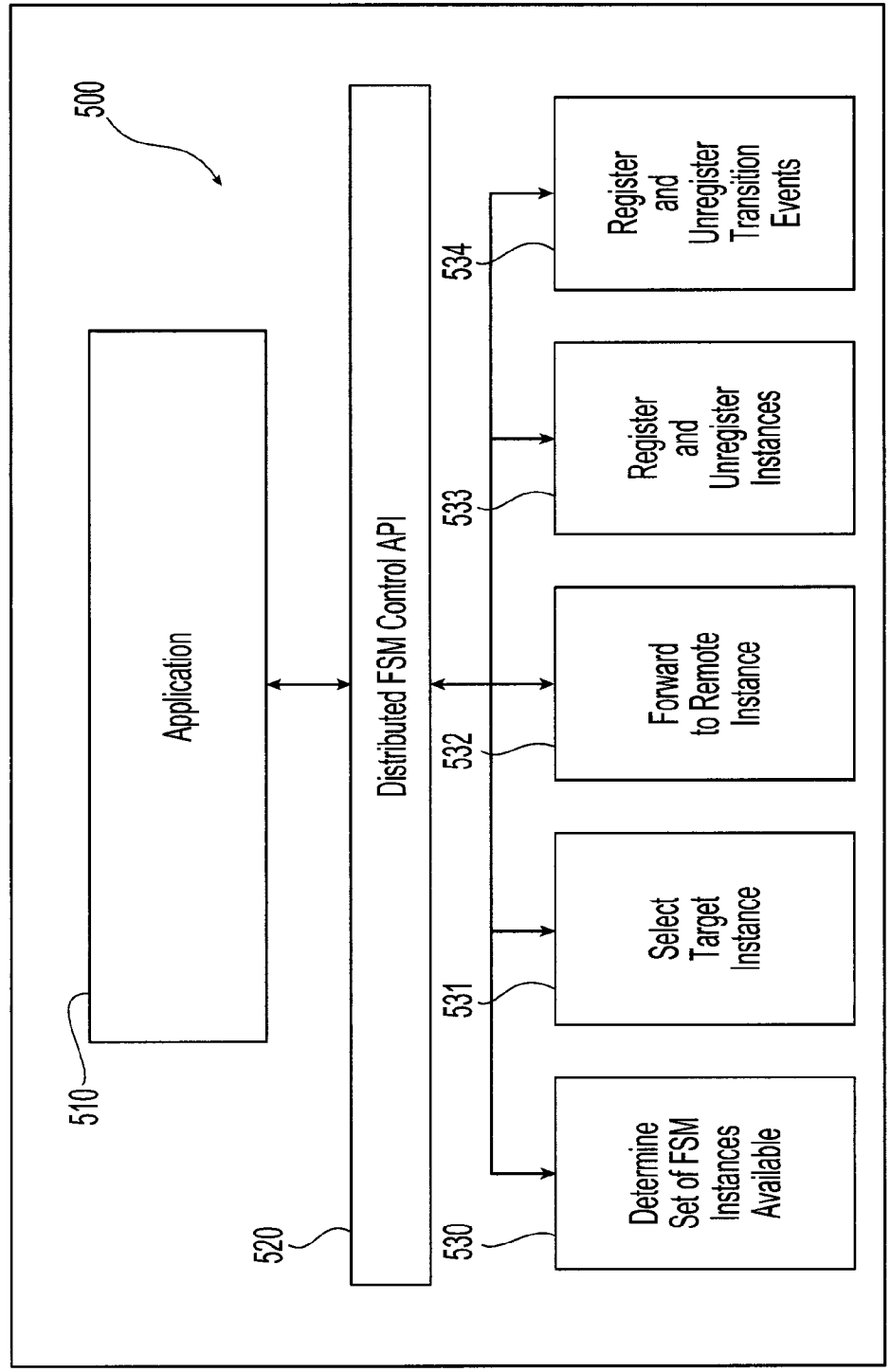
FIG. 6 is a schematic representation of an embodiment of a finite state machine application program interface for directing instance distribution.

Referring to FIG. 6, an exemplary embodiment of application control 500 of a finite state machine in accordance with the present invention is illustrated. As illustrated, an application 510 is in communication with at least one distributed FSM control application program interface (API) 520. Suitable applications include, but are not limited to, an application that employs a given FSM Instance, a network manager, an operating system and a human-computer interaction display and command center. The application 510 sends requests to and receives information from the distributed FSM control API 520. Suitable interactions available to the application through the API 520 include, but are not limited to, determining the set of FSM Instances available 530, selecting a target instance 531, location shifting a given instance 532, for example forwarding a transition or event to a target instance including remote target instance and local target instances, registering and un-registering instances 533, registering and un-registering transition events 534 and evicting, persisting or resuming a given instance (not shown). The registration of instances and transition events allows the distributed application to specify callback procedures in order to make self-accommodations when time-shifting or location-shifting, including preserving and restoring application-specific context. In addition to allowing an application to perform distribution related activities, the API 520 also facilitates control of other aspects of the distributed, serializable FSM behavior, for example accepting new FSM Specifications and accepting FSM Specification updates. Distribution of actions containing transitions, state entry and state exit are also controllable.

Figure 7:
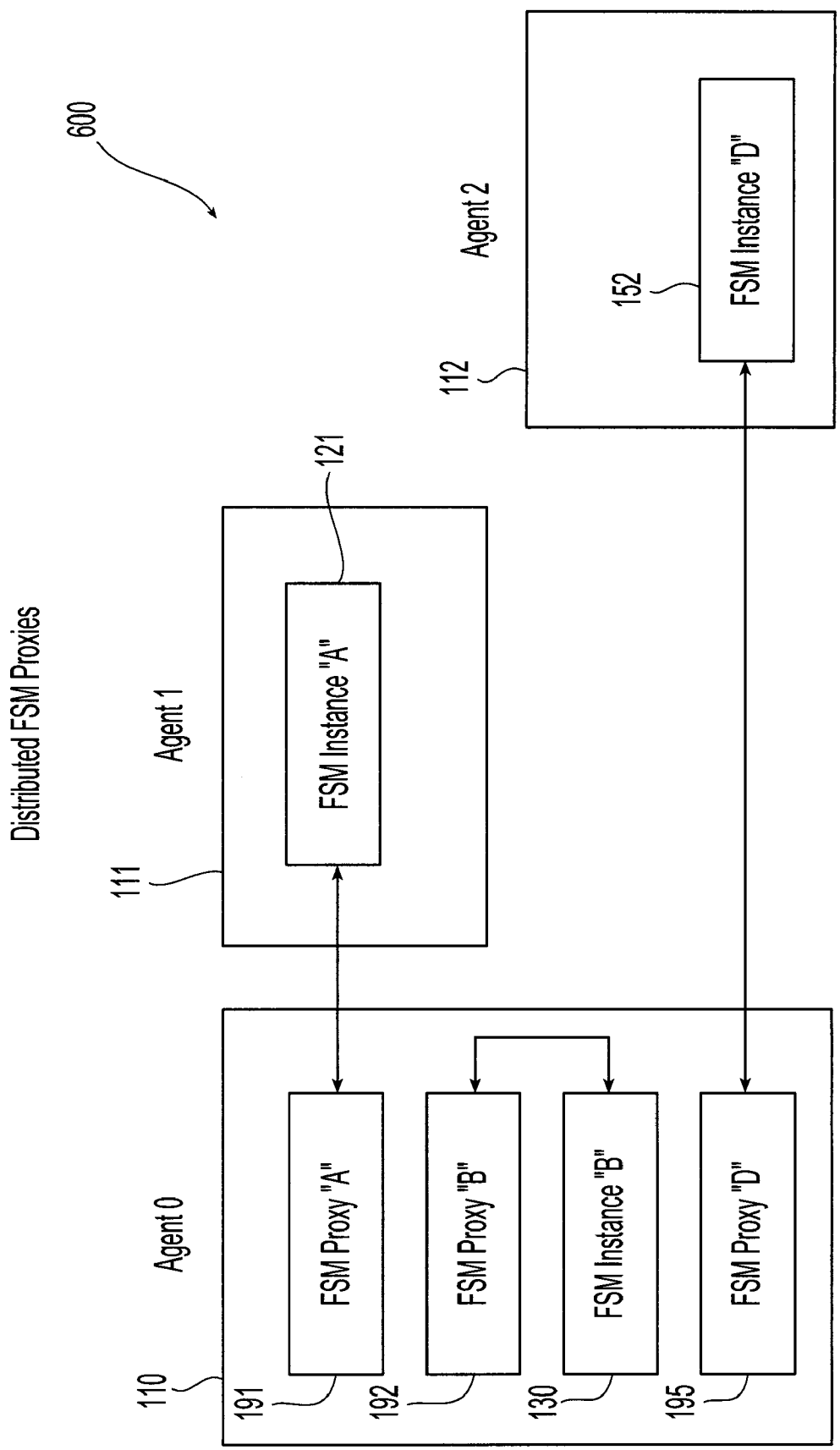
FIG. 7 is a schematic representation of an embodiment of distributed instance and proxies in accordance with the present invention.

Referring to FIG. 7, an exemplary embodiment of distributed FSM Proxies 600 for finite state machines in accordance with the present invention is illustrated. An application communicates or interacts with a given requested FSM Instance through an FSM proxy. Therefore, an FSM Proxy is an access portal to an FSM Instance. FSM Instances allow multiple independent specimens of a given FSM to be occurring simultaneously. Proxies allow remote access of FSM Instances. Both the FSM Instances and the FSM proxies operate on agents. However, the FSM proxy and the FSM Instance do not have to be located on the same agent, i.e. remote access of an FSM Instance is possible. As illustrated, three FSM proxies are located on a first agent, "Agent 0" 110. These proxies include FSM proxy "A" 191, FSM proxy "B" 192 and FSM proxy "D" 195. The FSM Instance 130 associated with FSM proxy "B" is also located on "Agent 0"; however, the FSM Instance 121 associated with FSM proxy "A" is located on a second agent, "Agent 1" 111. In addition, the FSM Instance 112 associated with FSM proxy "D" is located on a third agent, "Agent 2" 112. Therefore, FSM Instance "A" and FSM Instance "D" are remotely located from their corresponding proxies. Although all three proxies are shown on one agent in this example, there is no restriction as to on which hosts proxies and instances may be located.

In one exemplary method for utilizing finite states machines in accordance with the present invention, at least one instance of a finite state machine is initialized or initiated on a first agent. Alternatively, a plurality of finite state machine instances is initiated. These include multiple concurrent instances of the same finite state machine or instances of two or more finite state machines. These instances are typically initiated in response to a request from an application or user. Suitable agents are discussed above and include any platform suitable to provide for the processing of the finite state machine instance. When a plurality of finite state machines are initiated, they may all be initiated on the first agent or may be initiated on a plurality of separate distinct first agents. When a plurality of agents is used, these agents may all be disposed on a single node or platform within the computing system or may be disposed on a plurality of nodes distributed throughout the computing system or located in two or more domains.

Each finite state machine instance includes a plurality of states and a plurality of transitions between the states. That is, the transitions advance the finite state machine through the states. In one embodiment, executing a given transition changes the state of the finite state machine instance. In another embodiment, executing a given transition shifts the location of the finite state machine instance, i.e. changes agents, or shifts the finite state machine instance in time, i.e. moves the finite state machine instance to a persistent storage location. In one embodiment each transition includes a plurality of actions. Therefore, execution of a given transition involves execution of each action in that transition. These actions can be processed in series, in parallel or a combination thereof. In addition, these actions can be executed on a single agent, such as the agent on which the finite state machine instance is located, or on a plurality of separate, distributed agents.

In one embodiment, the finite state machine instance is shifted from the first agent where it was initiated to a second agent distinct from the first agent. When a plurality of finite state machines instances has been initiated, these instances are shifted among a plurality of different agents. In one embodiment, shifting of the finite state machine instances between or among agents is accomplished by directly removing each instance from the current agent and transferring and resuming the same instance on the new agent. Alternatively, each instance, in moving between agents can be transferred through a persistent storage location. The instance can be moved directly through the persistent storage location or can be held in the persistent storage location for a period of time. When held for a period of time, the instance is time shifted as well as location shifted. Therefore, in one embodiment, shifting of the finite state machine instance between agents involves, removing the finite state machine instance from the first agent, saving the removed finite state machine instance in persistent storage, removing the finite state machine instance from persistent storage and resuming the finite state machine instance on the second agent. In general, distribution of the finite state machine instance throughout the various agents as well as distribution of the actions that constitute the transitions in the finite state machine instance occurs under partial or complete direction of the application utilizing the finite state machine instance, a separate external, authorized application or system and combinations thereof.

In addition to a finite state machine instance being location shifted or both location and time shifted, in one embodiment, the finite state machine instance is just time shifted. The finite state machine instance is removed from the first agent and saved in persistent storage. The finite state machine instance is then held in persistent storage for a period of time. Following the period of time, the finite state machine instance is removed from persistent storage following expiration of the period of time and returned to the first agent. The period of time can be pre-determined or user-defined or can be defined by the occurrence of an event including the passage of time, a processing agent recycle, a processing agent failure and combinations thereof.

In order to facilitate the transfer of finite state machine instances between agents, serializing is used. As used herein, serializing refers to representing a given finite state machine instance in a format that is independent of a given agent or location so that the instance can be communicated between locations or stored in the persistent storage. Therefore, in one embodiment, each instance of a finite state machine is serialized and deserialized in progress, that is after the finite state machine instance has been initiated but before the instance is completed. Serializing can be conducted by the agents or by the finite state machine engine. In one embodiment, the finite state machine engine instance is serialized at the first agent and deserialized at the second agent. Application specific data associated with an FSM may also be serialized and deserialized respectively.

In one embodiment, the transitions associated with the finite state machine instance are executed to move the finite state machine instance between states. In addition, the transitions can be executed to produce time and location shifting in the finite state machine instance. In one embodiment, execution of each transition includes the execution of one or more actions. These actions can all be executed on a single agent or can be executed on two or more agents. The agent can be the same agent on which the finite state machine instance is resident or a different agent.

In one embodiment in order to facilitate communication between the finite state machine instance and the application utilizing that finite state machine instance, at least one externalized queue is created. Preferably, the externalized queue is the finite state machine proxy. The current state of the initialized finite state machine instance is communicated to the externalized queue so that the externalized queue can be utilized between the application requesting the finite state machine instance and the finite state machine instance. Externalized queues can be located on the same agent as the finite state machine instance or on a different agent. In one embodiment, the externalized queue is disposed on a third agent different from the first and second agents. Therefore, the instances and proxies can be utilized in a distributed fashion.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for utilizing finite state machines in a computing system in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for utilizing finite state machines in a computing system, the method comprising:
   initiating on a first agent at least one instance of a finite state machine specification comprising a plurality of suites and a plurality of transitions between the states;
   shifting the entire finite state machine instance from the first agent to a second agent, the first and second agents operating on at least one computing system; and
   using the finite state machine instance to cause the computing systems on which the agents are operating to run instances of user-defined routines.

2. The method of claim 1, wherein the step of initiating further comprises initiating a plurality of concurrent finite state machine instances for at least one finite state machine, the finite state machine instances initiated on two or more first agents; and
   the step of shifting further comprises shifting the finite state machine instances among a plurality of different agents.

3. The method of claim 1, wherein the step of shifting the finite state machine instance, further comprises:
   removing the finite state machine instance from the first agent;
   saving the removed finite state machine instance in persistent storage;
   removing the finite state machine instance from persistent storage; and
   resuming the finite state machine instance on the second agent.

4. The method of claim 1, further comprising:
   removing the finite state machine instance from the first agent;
   saving the removed finite state machine instance in persistent storage; and
   holding the finite state machine instance in persistent storage for a period of time.

5. The method of claim 4, further comprising:
   removing the finite state machine instance from persistent storage following expiration of the period of time; and
   returning the finite state machine instance to the first agent.

6. The method of claim 1, wherein the step of shifting the finite state machine instance further comprises at least one of:
   serializing the finite state machine instance;
   deserializing the finite state machine instance;
   serializing context data associated with the finite state machine instance; and
   deserializing the context data.

7. The method of claim 6, wherein:
the step of serializing the finite state machine instance further comprises serializing the finite state machine instance at the first agent;
the step of deserializing the finite state machine instance further comprises deserializing the finite state machine instance at the second agent;
the step of serializing the context data further comprises serializing the context data at the first agent; and
the step of deserializing the context data further comprises deserializing the context data at the second agent.

8. The method of claim 1, further comprising executing the transitions associated with the finite state machine instance to move the finite state machine instance between at least one of the states and agents.

9. The method of claim 8, wherein the step of executing the transitions further comprises executing one or more distributed actions associated with each transition.

10. The method of claim 9, further comprising executing the actions associated with each transition on two or more agents.

11. The method of claim 8, wherein the step of shifting the finite state machine instance further comprises shifting the finite state machine instance in response to the execution of one of the transitions.

12. The method of claim 1, further comprising:
creating at least one externalized queue;
recording a current state of the initiate finite state machine instance in the externalized queue; and
utilizing the externalized queue between an application requesting the finite state machine instance and the finite state machine instance.

13. The method of claim 12, wherein the step of creating the externalized queue comprises creating a finite state machine proxy.

14. The method of claim 12, wherein the externalized queue is disposed on a third agent different from the first and second agents.

15. A computer-readable storage medium containing a computer-readable code that when read by a computer causes the computer to perform a method for utilizing finite state machines in a computing system, the method comprising:
initiating on a first agent at least one instance of a finite state machine specification comprising a plurality of states and a plurality of transitions between the states; and
shifting the entire finite state machine instance from the first agent to a second agent.

16. The computer readable storage medium of claim 15, wherein the step of initiating further comprises initiating a plurality of concurrent finite state machine instances for at least one finite state machine, the finite state machine instances initiated on two or more first agents; and
the step of shifting further comprises shifting the finite state machine instances among a plurality of different agents.

17. The computer readable storage medium of claim 15, wherein the step of shifting the finite state machine instance further comprises:
removing the finite state machine instance from the first agent;
saving the removed finite state machine instance in persistent storage;
removing the finite state machine instance from persistent storage; and
resuming the finite state machine instance on the second agent.

18. The computer readable storage medium of claim 15, wherein the method further comprises:
removing the finite state machine instance from the first agent;
saving the removed finite state machine instance in persistent storage; and
holding the finite state machine instance in persistent storage for a period of time.

19. The computer readable storage medium of claim 18, wherein the method further comprises:
removing the finite state machine instance from persistent storage following expiration of the period of time; and
returning the finite state machine instance to the first agent.

20. The computer readable storage medium of claim 15, wherein the step of shifting the finite state machine instance further comprises:
serializing the finite state machine instance; and
deserializing the finite state machine instance.

21. The computer readable storage medium of claim 20, wherein:
the step of serializing the finite state machine instance further comprises serializing the finite state machine instance at the first agent; and
the step of deserializing the finite state machine instance further comprises deserializing the finite state machine instance at the second agent.

22. The computer readable storage medium of claim 15, wherein the method further comprises executing the transitions associated with the finite state machine instance to move the finite state machine instance between states.

23. The computer readable storage medium of claim 22, wherein the step of executing each one of the transitions further comprises executing one or more actions associated with each transition.

* * * * *